US012560380B2

(12) United States Patent
Brasil et al.

(10) Patent No.: US 12,560,380 B2
(45) Date of Patent: Feb. 24, 2026

(54) SEALING SYSTEM WITH AUTOMATIC COMPENSATION FOR THERMAL EXPANSION FOR A ROTARY CYLINDRICAL REACTOR

(71) Applicant: Tecnored Desenvolvimento Tecnologico S.A., Pindamonhangaba (BR)

(72) Inventors: Ludmila Lopes Nascimento Brasil, Rio de Janeiro (BR); Ronald Lopes De Oliveira, Pindamonhangaba (BR); Guilherme Francisco Gonçalves, Pindamonhangaba (BR); Álvaro Guedes Soares, Mogi Mirim (BR); Fabrício Tinôco Fróis, Pindamonhangaba (BR); Ezequiel Da Silva, Lorena (BR); Stephen Michael Potter, Rio de Janeiro (BR)

(73) Assignee: TECNORED DESENVOLVIMENTO TECNOLOGICO S.A., Pindamonhangaba (BR)

( * ) Notice: Subject to any disclaimer, the term of this patent is extended or adjusted under 35 U.S.C. 154(b) by 397 days.

(21) Appl. No.: 18/027,957

(22) PCT Filed: Sep. 17, 2021

(86) PCT No.: PCT/BR2021/050397
§ 371 (c)(1),
(2) Date: Mar. 23, 2023

(87) PCT Pub. No.: WO2022/061434
PCT Pub. Date: Mar. 31, 2022

(65) Prior Publication Data

US 2023/0366625 A1 Nov. 16, 2023

(30) Foreign Application Priority Data

Sep. 24, 2020 (BR) .................... BR102020019375-9

(51) Int. Cl.
*F27B 7/24* (2006.01)

(52) U.S. Cl.
CPC ...................................... *F27B 7/24* (2013.01)

(58) Field of Classification Search
CPC ..................................... F27B 7/22; F27B 7/24
See application file for complete search history.

(56) References Cited

U.S. PATENT DOCUMENTS 2,702,218 A * 2/1955 Schoonover .......... F26B 11/022 384/549
3,481,636 A * 12/1969 Dieter .................. F27B 7/2206 384/537

(Continued)

FOREIGN PATENT DOCUMENTS

AT 397861 B * 7/1994 ................ F27B 7/24
BR 7907438 5/1981

(Continued)

OTHER PUBLICATIONS

Dancer roll, Aug. 25, 2010, Somatec https://www.somatec-hameln.com/information/encyclopedia/41-dancer-roll.htm (Year: 2010).*

(Continued)

*Primary Examiner* — Steven B Mcallister
*Assistant Examiner* — Michael James Giordano
(74) *Attorney, Agent, or Firm* — LUCAS & MERCANTI, LLP

(57) ABSTRACT

The present invention relates to self-compensating thermal expansion sealing systems. In this context, the present invention provides a self-compensating thermal expansion sealing system for a cylindrical rotating reactor (2) comprising (a) a first self-compensating portion (8) positioned at a first end of the cylindrical rotating reactor (2), the first self-compensating portion (8) comprising (a.1) a guide ring (80) fixed to the support structure of the cylindrical rotating (Continued)

reactor (2), (a.2) an axially sliding housing ring (84) adjacent to the guide ring (80), the axially sliding housing ring (84) being sliding with respect to the guide ring (80) in the axial direction, and (a.3) a first ring-shaped bearing race (22) fixed to the housing of the cylindrical rotating reactor (2) and resting on a first support roller (32), the first bearing race (22) sliding in the radial direction with respect to the axially sliding housing ring (84) and integral with it in the axial direction of the cylindrical rotating reactor (2); and (b) a second self-compensating portion (9) positioned at a second end of the cylindrical rotating reactor (2), opposite the first, the second self-compensating portion (9) comprising (b.1) a fixed housing ring (94) to the support structure of the cylindrical rotating reactor (2) and (b.2) a second bearing race (23) in the form of a ring fixed to the cylindrical rotating reactor housing (2) and resting on a second support roller (33), the second bearing race (23) being rotatably sliding with respect to the fixed housing ring (94) and sliding in axial direction with respect thereto.

8 Claims, 3 Drawing Sheets

(56) References Cited

U.S. PATENT DOCUMENTS

| | | | |
|---|---|---|---|
| 4,209,175 | A | 6/1980 | Bliemeister |
| 4,213,754 | A | 7/1980 | Wens |
| 5,106,105 | A | 4/1992 | Drexler |
| 5,174,750 | A | 12/1992 | Flading et al. |
| 5,890,814 | A | 4/1999 | Catlett |
| 7,686,612 | B1 | 3/2010 | Buteau |
| 2003/0202756 | A1 | 10/2003 | Hurley et al. |
| 2009/0007484 | A1 | 1/2009 | Smith |
| 2019/0093949 | A1 | 3/2019 | Zhu |

FOREIGN PATENT DOCUMENTS

| | | |
|---|---|---|
| BR | 112013008504-5 | 7/2017 |
| EP | 2510265 | 10/2013 |
| WO | WO 2006/000283 | 1/2006 |
| WO | WO 2020/126699 | 6/2020 |
| WO | WO 2022/061434 | 3/2022 |

OTHER PUBLICATIONS

Relatório de Pesquisa Internacional e Opinião Escrita [International Search Report and the Written Opinion] Dated Dec. 6, 2021 From the International Searching Authority Re. Application No. PCT/BR2021/050397 and Its Translation of Search Report Into English. (11 Pages).

Resolución de Notificación del Informe Pericial (Ley Nueva), Informe de Busqueda y Informe Pericial [Notification of the Search and Expert Report] Dated May 16, 2024 From the Ministerio de Economia, Fomento y Turismo, INAPI, Gobierno de Chile Re. Application No. 202300850 and Its Translation Into English. (13 Pages).

* cited by examiner

SEALING SYSTEM WITH AUTOMATIC COMPENSATION FOR THERMAL EXPANSION FOR A ROTARY CYLINDRICAL REACTOR

RELATED APPLICATIONS

This application is a National Phase of PCT Patent Application No. PCT/BR2021/050397 having International filing date of Sep. 17, 2021, which claims the benefit of priority of Brazil Patent Application No. BR102020019375-9 filed on Sep. 24, 2020. The contents of the above applications are all incorporated by reference as if fully set forth herein in their entirety.

FIELD AND BACKGROUND OF THE INVENTION

The present invention relates to thermal expansion self-compensating systems. In particular, to a self-compensating thermal expansion system in cylindrical rotating reactors.

Among the most common applications of cylindrical rotating reactors are the drying of organic matter and food, biomass roasting and pyrolysis, and the treatment of mineral coals. In general, these processes require hermetic reactors, with a sealing system that prevents the entry of atmospheric air or the unintentional escape of reactant gases. In all these applications, in view of the temperature variations to which the reactor is subjected, it is difficult to seal it, taking into account the thermal expansion of the reactor and the fact that it has moving parts.

Several techniques for thermal expansion compensation in cylindrical rotating reactors are known today. Below are some of the documents that reveal such mechanisms.

Document BR112013008504-5 B1 describes a biomass torrefaction system comprising: (i) an inlet to receive the biomass particles; (ii) a reactor drum configured to rotate about an axis of rotation, the reactor drum having a plurality of vanes positioned therein at a plurality of locations along a longitudinal length of the reactor drum, the vanes disposed within the drum at selected positions and density to improve the characteristics of particles resulting from biomass subjected to torrefaction; (iii) a heat source upstream of the drum reactor to heat the gas contained in the system to a temperature sufficient to roast the biomass particles during operation; (iv) a fan device coupled to the system to create, when the system is in operation, a stream of heated gas through the drum reactor sufficient to intermittently transport the biomass particles along the longitudinal length of the drum reactor as the biomass particles are lifted through the vanes and poured through the stream of heated gas, while the drum reactor rotates; (v) and gas pipelines coupled to at least the drum reactor, heat source and blower device for recirculating at least a portion of the gas exiting the drum reactor back to the heat source to reheat the gas for reintroduction to the drum reactor. However, nothing is mentioned in document BR112013008504-5 B1 about cylindrical reactor thermal expansion self-compensating sealing mechanisms.

Document US20090007484 A1 describes an apparatus and a process for producing carbonaceous and/or hydrocarbon materials from a biomass composition, the apparatus including: (i) a charge port; (ii) a thermal decomposition assembly including a reactor comprising an inner hollow cylinder, an outer hollow cylinder, one of which is rotatable with respect to the other, both heated hollow cylinders supplying heat to the feed composition to convert it into a vapor fraction and a solid residue fraction; (iii) vanes mounted relative to the inner and outer hollow cylinders to move the biomass composition through the thermal decomposition assembly; (iv) at least one steam port to remove the steam fraction containing a hydrocarbon material; (v) and at least one solids gate to remove the solid fraction, containing a carbonaceous material. However, nothing is mentioned in document US20090007484 A1 about cylindrical reactor thermal expansion self-compensating sealing mechanisms.

Document US20030202756 A1 discloses a rotating heat treatment drum with a toothed edge arranged in the drum housing and supported at various peripheral points in the drum housing by evenly distributed bridge members. Each bridge member includes two clips spaced axially apart from each other and welded to the drum shell, and a cross plate that connects the clips and is radially away from the drum shell. Each cross plate is rigidly connected to one clip and slidably connected in the axial direction to the other clip, so that different degrees of thermal expansion and consequent deformation of the cross plates and increased stress on the cross plates, clips, and connection points can be compensated for. Document US20030202756 A1, however, does not address the issue of ensuring gas sealing to prevent ingress or egress from the rotating drum.

Document U.S. Pat. No. 5,890,814 A describes a rotating drum arrangement, in which the drum is mounted on support rings so that circumferential expansion and contraction of the drum relative to said support rings does not adversely affect the assembly. In a preferred mode, the drum blocks are mounted on the drum and the corresponding ring blocks are mounted on the support ring. The side surfaces of adjacent drum blocks and ring blocks support the weight of the drum in the ring. In this arrangement, gaps can be maintained between the drum and the support ring to allow for expansion and contraction of the drum. In the preferred mode, there is also a drive sprocket mounted on the drum with a sprocket mounting arrangement that also accommodates expansion and contraction of the drum. Also, in the U.S. Pat. No. 5,890,814 A document, the issue of rotating drum tightness is not discussed.

Thus, although documents US20030202756 A1 and U.S. Pat. No. 5,890,814 A reveal mechanisms to allow for thermal expansion of the cylindrical reactor, they have temperature gradient limitations, as they do not allow for large expansions of the cylinder.

The present invention, therefore, aims at solving the problems mentioned above, since there is not a self-compensating thermal expansion system in the state of the art that is adapted to a cylindrical rotating reactor, which ensures the sealing between the moving and stationary parts of the equipment, and, therefore, the hermeticity of the reaction means, with a wide range of working temperatures, which ends up generating large expansion variations.

SUMMARY OF THE INVENTION

The main objective of the present invention is to provide a self-compensating thermal expansion sealing system for a wide temperature range cylindrical rotating reactor, allowing higher thermal expansions when compared to the prior state of art In order to achieve the above described objectives, the present invention provides a self-compensating thermal expansion sealing system for a cylindrical rotating reactor comprising (a) a first self-compensating portion positioned at a first end of the cylindrical rotating reactor, the first self-compensating portion comprising (a.1) a guide ring fixed to the support structure of the cylindrical rotating reactor, (a.2) an axially sliding housing ring adjacent the guide ring, the axially sliding housing ring being sliding with respect to the guide ring in the axial direction, and (a.3) a first ring-shaped bearing race fixed to the rotating cylindrical reactor housing and supported on a first support roller, the first bearing race being sliding in the radial direction with respect to the axially sliding housing ring and integral with it in the axial direction of the cylindrical rotating reactor; and (b) a second self-compensating portion positioned at a second end of the cylindrical rotating reactor, opposite the first, the second self-compensating portion comprising (b.1) a housing ring fixed to the support structure of the cylindrical rotating reactor and (b.2) a second ring-shaped bearing race fixed to the housing of the cylindrical rotating reactor and supported on a second support roller, the second bearing race being rotatably sliding with respect to the fixed housing ring.

BRIEF DESCRIPTION OF THE SEVERAL VIEWS OF THE DRAWINGS

The detailed description presented below makes reference to the attached figures and their respective reference numbers.

DESCRIPTION OF SPECIFIC EMBODIMENTS OF THE INVENTION

Preliminarily, it is emphasized that the description that follows will start from preferred embodiments of the invention. As will be evident to anyone skilled in the subject, however, the invention is not limited to these particular embodiments.

The present invention solves the technical problem described above by providing a self-compensating thermal expansion sealing system for a cylindrical rotating reactor 2. For the purposes of this description, a cylindrical rotating reactor 2 is defined as a cylindrical rotating body with openings at its ends.

Figure 1:
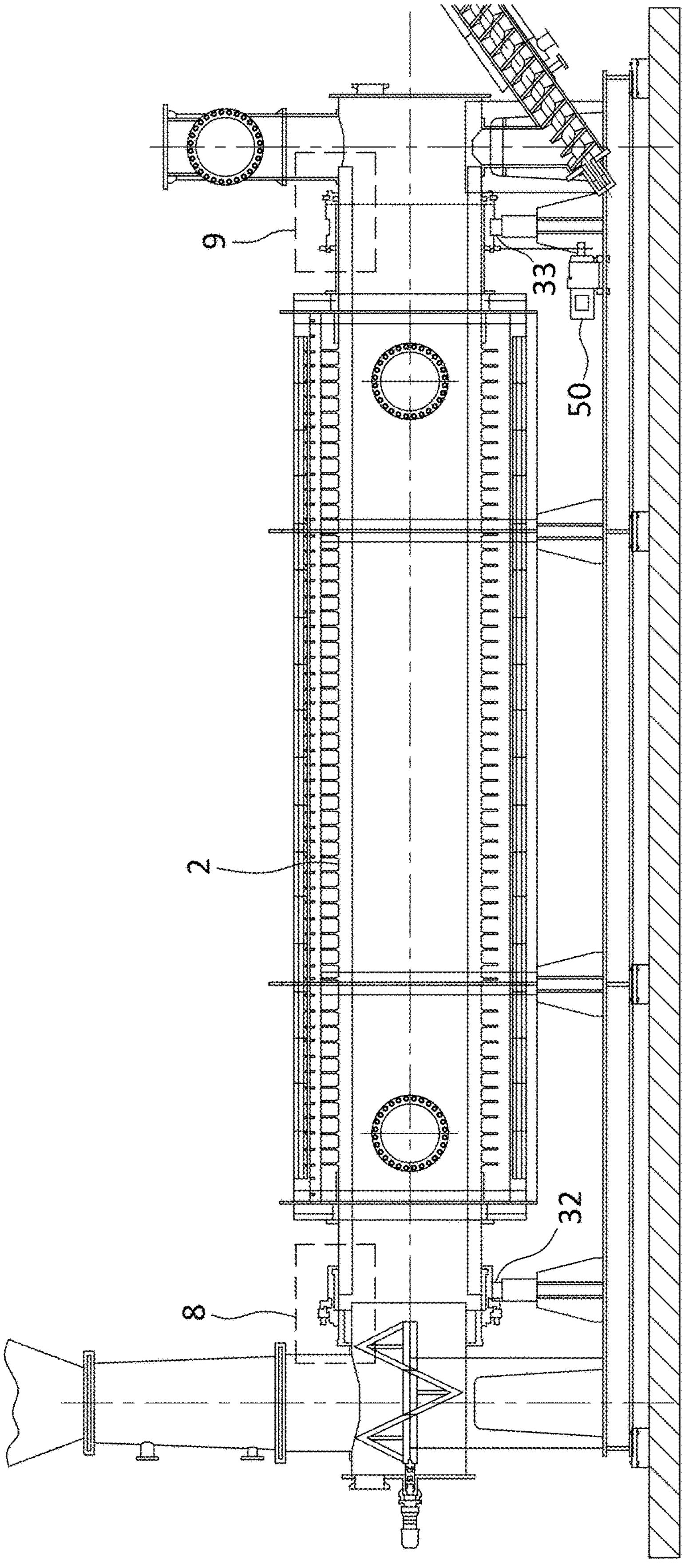
FIG. 1 illustrates a side view of the cylindrical reactor comprising the self-compensating sealing system according to the preferred embodiment of the present invention.
Figure 2:
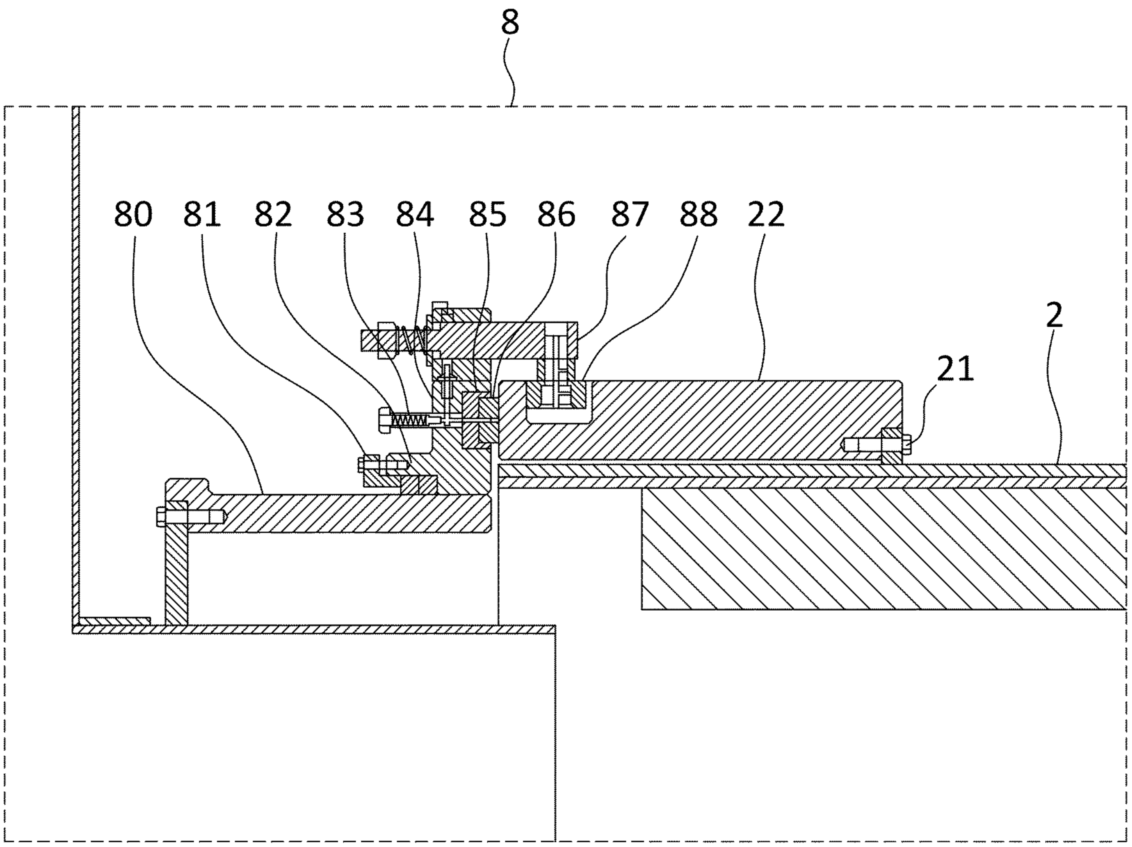
FIG. 2 illustrates a detailed view of a first portion of a self-compensating sealing system according to a preferred embodiment of the present invention.
Figure 3:
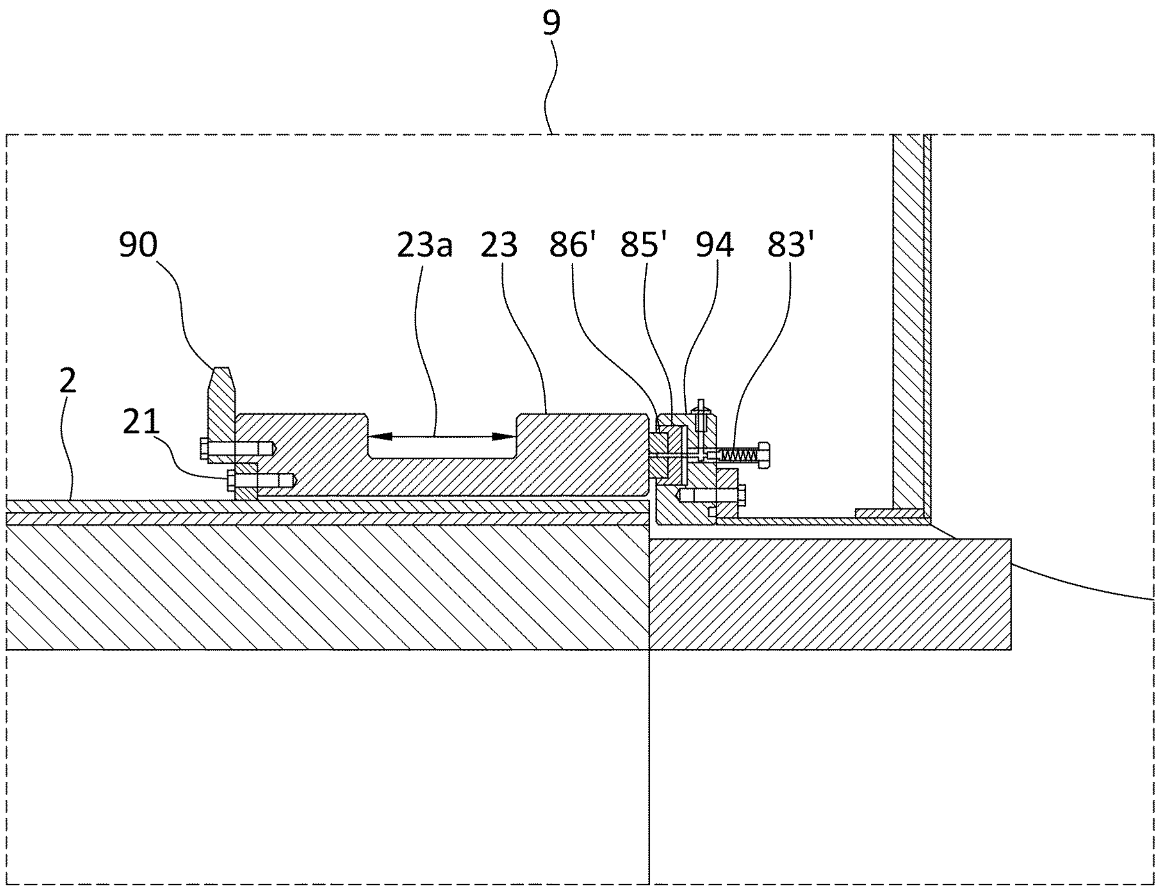
FIG. 3 illustrates a detailed view of a second portion of the self-compensating sealing system according to the preferred embodiment of the present invention.

The system of the present invention, according to a preferred embodiment illustrated in FIGS. 1 to 3, comprises a first self-compensating portion 8 positioned at a first end of the cylindrical rotating reactor 2, and a second self-compensating portion 9 positioned at a second end of the rotating cylindrical reactor 2, the second end of the rotating cylindrical reactor 2 being opposite of the first end.

According to a preferred embodiment of the present invention, the first self-compensating portion 8 further comprises a first ring-shaped bearing race 22 fixed to the housing of the cylindrical rotating reactor 2 and supported on a first support roller 32 which is responsible for slidably and rotationally supporting the first end of the rotating cylindrical reactor 2, as shown in FIG. 1. At the opposite end, the second self-compensating portion 9 further comprises a first ring-shaped bearing race 23 attached to the housing of the cylindrical rotating reactor 2 and supported on a first support roller 33 that is responsible for slidably and rotationally supporting the first end of the rotating cylindrical reactor 2.

As can be seen in FIGS. 2 and 3, the bearing races 22 and 23, respectively in the self-compensating portions 8 and 9, have a fundamental distinction: bearing race 23 has a cellar represented by the number 23*a*, in distinction from runway 22 which is smooth. In this so-called cellar 23*a* of the bearing race 23 the bearing roller 33 is housed. In this way, no axial displacement is allowed to the bearing race 23 and the expansion (or contraction) of the cylindrical rotating reactor 2, due to the heating (or cooling) thereof, is fully transferred to the self-compensating portion 8, causing the bearing roller 32 to slide axially on the bearing race 22.

Additionally, the first self-compensating portion 8 comprises a guide ring 80 attached to the support structure of the cylindrical rotating reactor 2. The guide ring 80 is a stationary ring.

The first portion of self-compensating 8 also comprises an axially sliding housing ring 84 surrounding the guide ring 80, the axially sliding housing ring 84 being axially sliding with respect to the guide ring 80 and rotationally stationary with respect to the cylindrical rotating reactor. The fact that the axially sliding housing ring 84 is movable in the axial direction with respect to the guide ring 80 allows axial dilatation compensation of the cylindrical rotating reactor 2. The axially sliding housing ring 84 houses a first backup ring 85, in which at least one first side seal gasket 86 is installed.

The second self-compensating portion 9 also comprises a housing ring, but this is a fixed housing ring 94, which in turn houses a second backup ring 85', into which is fitted at least a second side seal 86'.

The first bearing race 22 is sliding in the radial direction with respect to the axially sliding housing ring 84 and sympathetic to it in the axial direction of the cylindrical rotating reactor 2.

Preferably, upon thermal expansion of the cylindrical rotating reactor 2, the first bearing race 22 pushes the axially sliding housing ring 84 in the opposite direction to the second self-compensating portion 9. When contraction due to cooling of the cylindrical rotating reactor 2, a track roller 88 attached to the upper portion of the axially sliding housing ring 84 by means of a track roller support 87 is responsible for solidifying the movement of the first bearing race 22 with that of the axially sliding housing ring 84. Thus, when the cylindrical rotating reactor 2 cools down, the first bearing race 22 "pulls" the axially sliding housing ring 84 toward the second self-compensating portion 9 by means of the guiding roller 88 and its respective guiding roller support 87.

Preferably, the guiding roller 88 contacts a lateral surface of a recess of the first bearing raceway 22 and predisposes said axially sliding housing ring 84 towards the first bearing race 22. Also, preferably, a plurality of guiding rollers 88 and guiding roller supports 87 are provided along the circumference of the axially sliding housing ring 84.

Preferably, in the preferential implementation of the present invention, the first portion of self-commissioning 8 comprises additionally a first backup ring 85 lodged with a side cavity of the axially sliding axial housing ring 84, the first backup ring 85 being predisposed in the direction of a lateral face of the bearing race 22 by means of at least one elastic element. More preferably, at least one first side gasket 86 compressed between the first backup ring 85 and the side face of the first bearing race 22 is provided. The backup ring 85 is stationary and there is a dimensional gap between it and the side cavity of the axially sliding housing ring 84 where it is inserted. This clearance allows the first backup ring 85 to move and absorb any angular misalignment between the axis of the cylindrical rotating reactor 2 and the axis of its support structure.

Preferably, the at least one elastic element is at least a first pin roll 83. Still preferably, a plurality of first pin rolls 83 are provided along the circumference of the axially sliding housing ring 84.

Preferably, the first self-compensating portion 8 additionally comprises at least one lower gasket 82 compressed between the axially sliding housing ring 84 and the upper face of the guide ring 80. Optionally, a pressure ring 81 attached to the axially sliding housing ring 84 through screws is provided to adjust the pressure of the at least one lower gasket 82.

As can be seen in FIG. 3, the second portion of self-compensating 9 is positioned at a second end of the cylindrical rotating reactor 2, opposite to the first. As mentioned above, the second self-compensating portion 9 comprises a fixed housing ring 94 to the support structure of the cylindrical rotating reactor 2.

Additionally, in accordance with a preferred embodiment of the present invention, the second self-compensating portion 9 further comprises a second ring-shaped bearing race 23 attached to the housing of the cylindrical rotating reactor 2 and supported on a second support roller 33 which is responsible for rotatably supporting the second end of the cylindrical rotating reactor 2, as shown in FIG. 1.

The second bearing race 23 preferably comprises a cellar **23*a* adapted to fit the respective second support roller 33. The second support roller 33 works within this cellar 23*a*, so that it prevents the bearing race 23 from moving in the direction axial to the cylindrical rotating reactor 2. All axial displacement due to the increased length of the rotating body is directed to the first portion of self-compensating 8. Since in the preferred embodiment of the present invention the first bearing race 22 does not have an equivalent recess, the first support roller 32 is allowed to slip axially along the first bearing race 22** whenever the rotating body is heated or cooled.

Preferably, the second self-compensating portion 9 further comprises a second backup ring 85' loosely housed in a lateral cavity of the fixed housing ring 94, the second backup ring 85' being predisposed towards a lateral face of the second bearing race 23 by means of at least a second elastic element. More preferably, at least a second side gasket 86' compressed between the second backup ring 85' and the side face of the second bearing race 23 is provided. The second backup ring 85'is preferably identical to the first backup ring 85 described above, in order to move and absorb any angular misalignment between the axis of the cylindrical rotating reactor 2 and the axis of its support structure.

Preferably, the at least one elastic element is at least a second pin roll 83'. Still preferably, a plurality of second pin rolls 83' are provided along the circumference of the fixed housing ring 94.

Preferably, the first 22 and second 23 bearing races are attached to the surface of the cylindrical rotating reactor 2 by screwing into at least one ring 21 attached to the surface of the cylindrical rotating reactor 2, as shown in FIGS. 2 and 3. Alternatively, the first 22 and second 23 bearing races are attached to the surface of the cylindrical rotating reactor 2 by welding on at least one centering ring 21 attached to the surface of the cylindrical rotating reactor 2 (not shown).

Alternatively, the first 22 and second 23 bearing races are attached to the surface of the cylindrical rotating reactor 2 by direct welding to the surface of the cylindrical rotating reactor 2 (not shown). Alternatively, the first 22 and second 23 bearing races are attached to the surface of the cylindrical rotating reactor 2 by direct screwing to the surface of the cylindrical rotating reactor 2 (not shown).

Preferably, the cylindrical rotating reactor 2 is driven by a motor 50 whose shaft comprises at least one gear (not shown) engaged to a ring gear 90 attached to one of the bearing races 22, 23. More preferably, the ring-shaped gear 90 is attached to the second bearing race 23.

Therefore, as set forth above, the present invention provides a self-compensating thermal expansion sealing system for a wide temperature spectrum cylindrical rotating reactor, allowing higher thermal expansions when compared to the prior state of art.

Numerous variations affecting the scope of protection of the present application are allowed. Thus, it is reinforced that the present invention is not limited to the particular configurations/concretizations described above.

The invention claimed is:

1. A self-compensating thermal expansion sealing system for a cylindrical rotating reactor comprising:

a first self-compensating portion positioned at a first end of the cylindrical rotating reactor, the first self-compensating portion comprising:

a guide ring attached to the support structure of the cylindrical rotating reactor;

an axially sliding housing ring adjacent to the guide ring, the axially sliding housing ring being sliding with respect to the guide ring in the axial direction; and a first ring-shaped bearing race attached to the housing of the cylinder rotating reactor and supported on a first support roller, the first bearing race being sliding in the radial direction with respect to the axially sliding housing ring and supportable to it in the axial direction of the cylindrical rotating reactor, and a second self-compensating portion positioned at a second end of the cylindrical rotating reactor, opposite the first, the second self-compensating portion comprising:

a fixed housing ring to the support structure of the cylindrical rotating reactor;

a second ring-shaped bearing race attached to the cylindrical rotating reactor housing and supported on a second support roller, the second bearing race being rotatably sliding with respect to the fixed housing ring, wherein the second bearing race comprises a cellar adapted for engagement with the respective second support roller.

2. The system according to claim 1, wherein the first self-compensating portion further comprises a first back up ring housed with a clearance in a side cavity of the axially sliding axial housing ring, the first back up ring being predisposed in the direction of a side of the first bearing race by at least one first elastic element.

3. The system according to claim 1, wherein the second self-compensating portion further comprises a second back up ring housed with a clearance in a lateral cavity of the fixed housing ring, the second back up ring being predisposed towards a lateral face of the second bearing race by means of at least a second elastic element.

4. The system according to claim 2, further comprising at least one first side gasket compressed between the first back up ring and the side face of the first bearing race.

5. The system according to claim 3, further comprising at least one second side gasket compressed between the second back up ring and the side face of the second bearing race.

6. The system according to claim 1, further comprising at least one lower gasket compressed between the axially sliding housing ring and the upper face of the guide ring.

7. The system according to claim 1, wherein the first self-compensating portion comprises at least one guiding roll, each guiding roll being fixed by support guide to an upper portion of the axially sliding housing ring, the at least one guiding roller contacting a side surface of a recess of the first bearing race and the axially sliding housing ring predisposed towards the first bearing race by means of the at least one guiding roller.

8. The system according to claim 1, wherein the first and second bearing races are attached to the surface of the cylindrical rotating reactor by means of at least one of:

screwed to at least one ring attached to the surface of the cylindrical rotating reactor;

welding on at least one ring attached to the surface of the cylindrical rotating reactor;

direct welding on the surface of the cylindrical rotating reactor; and direct screwing on the surface of the cylindrical rotating reactor.

* * * * *